(No Model.)  
8 Sheets—Sheet 1.
F. P. ROSBACK.
BOOK STAPLING MACHINE.
No. 493,298. Patented Mar. 14, 1893.
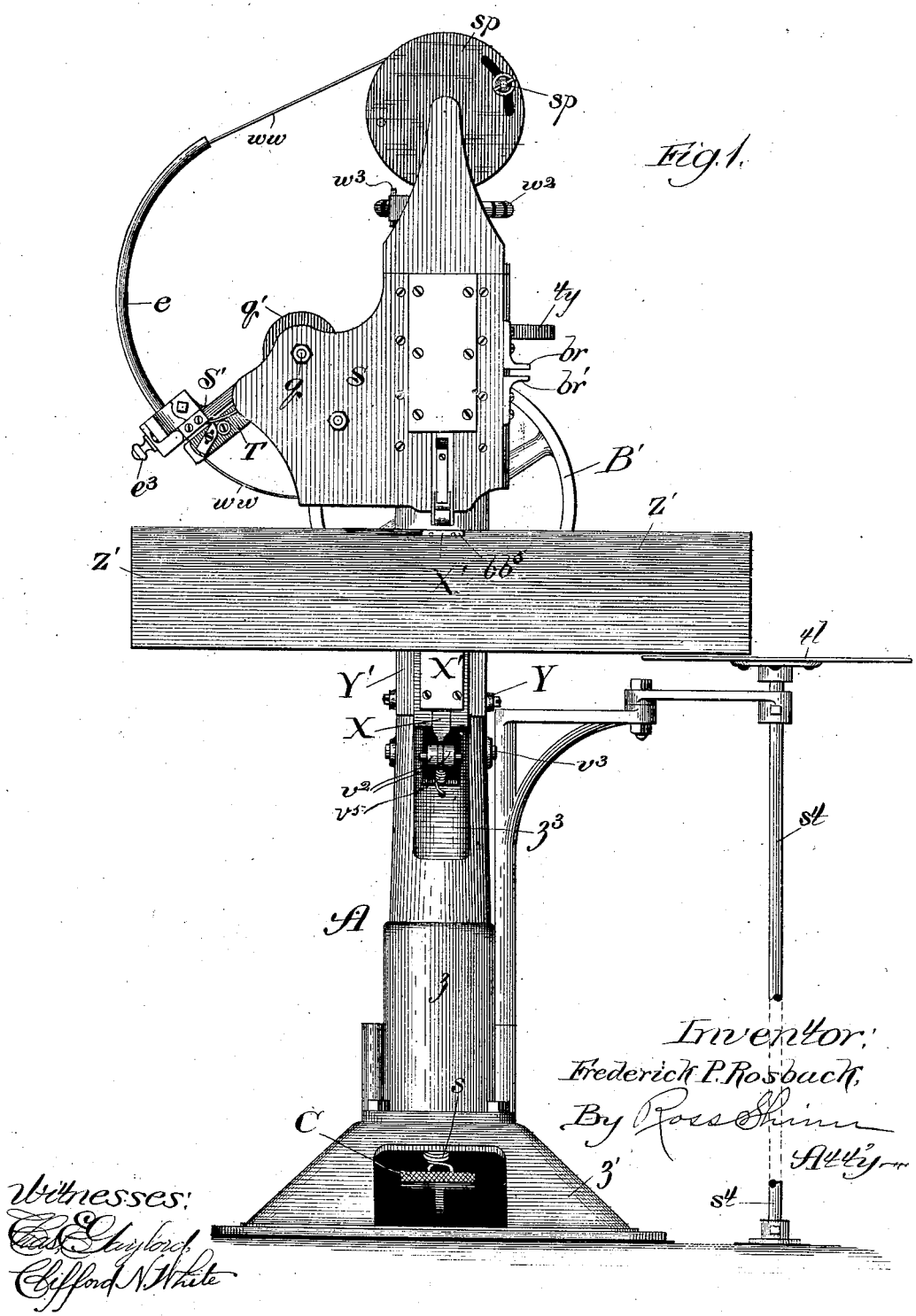
Witnesses:  
Chas. Gaylord  
Clifford N. White
Inventor:  
Frederick P. Rosback,  
By Ross Shinn  
Atty.

(No Model.) 8 Sheets—Sheet 2.
F. P. ROSBACK.
BOOK STAPLING MACHINE.
No. 493,298. Patented Mar. 14, 1893.
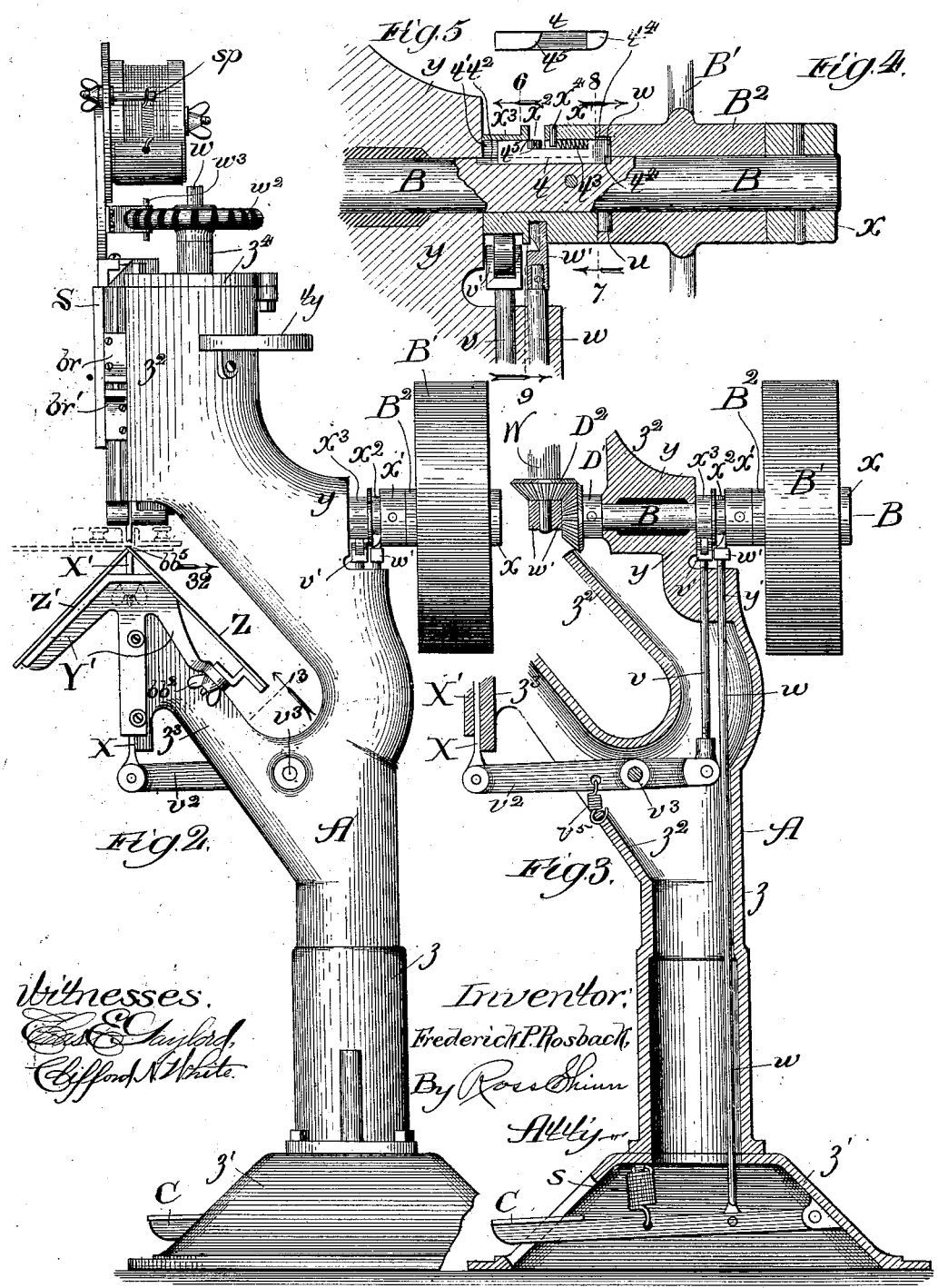
Witnesses
Chas. E. Gaylord
Clifford N. White
Inventor:
Frederick P. Rosback,
By Ross Shinn
Atty

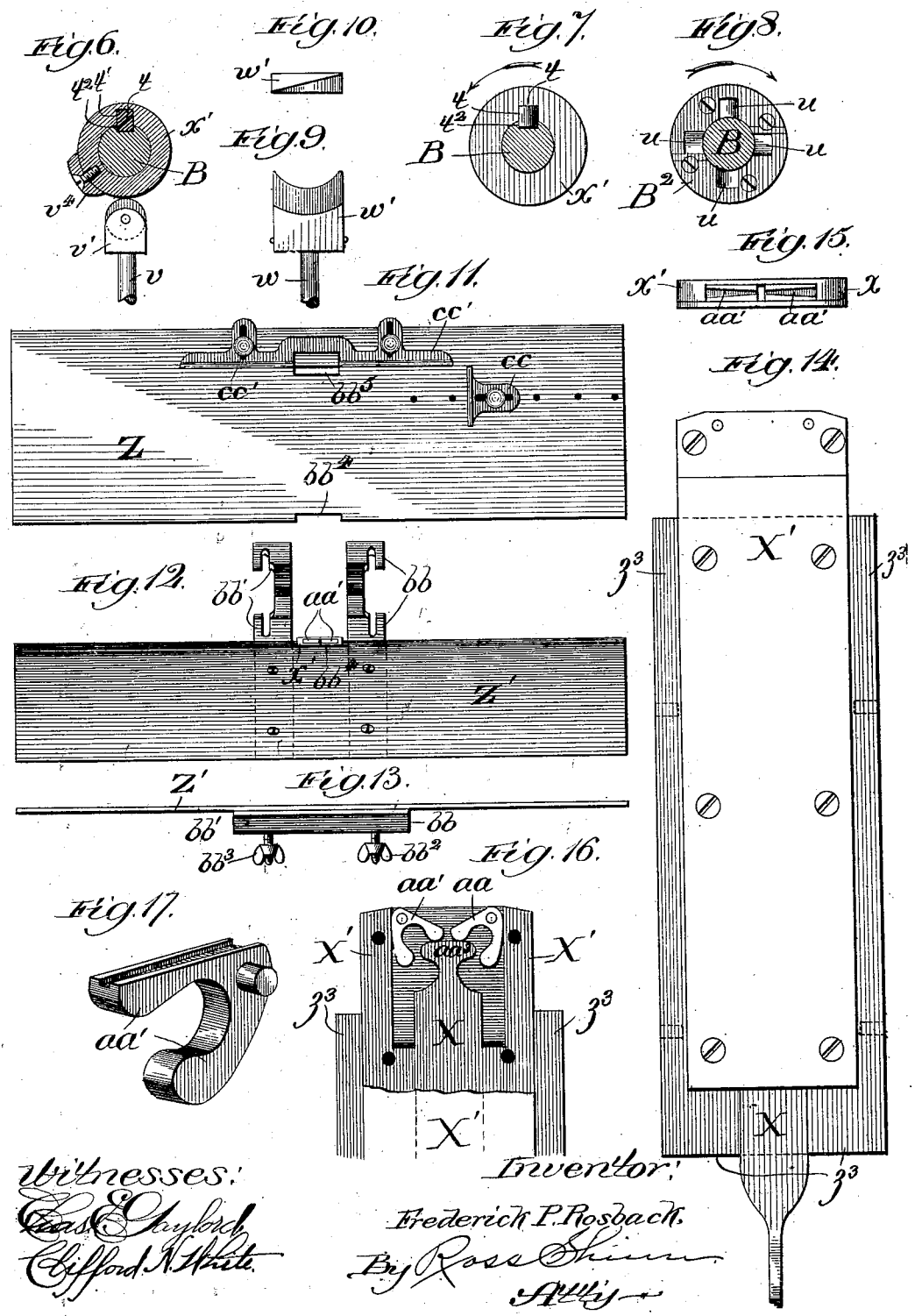

(No Model.)  F. P. ROSBACK.  8 Sheets—Sheet 4.
BOOK STAPLING MACHINE.
No. 493,298.  Patented Mar. 14, 1893.
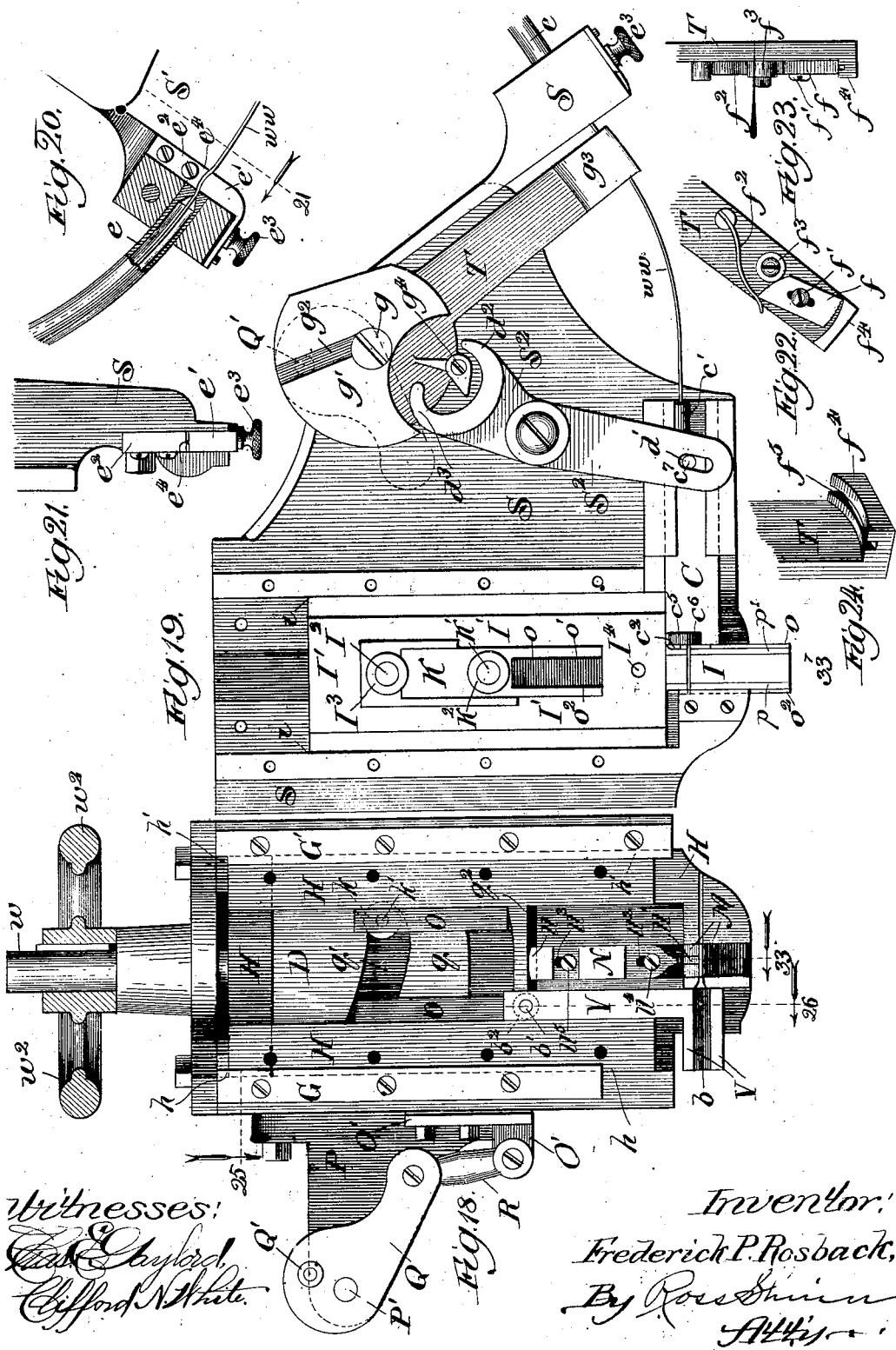
Witnesses:
Chas E Gaylord
Clifford N White
Inventor:
Frederick P. Rosback,
By Ross Shuman
Attys

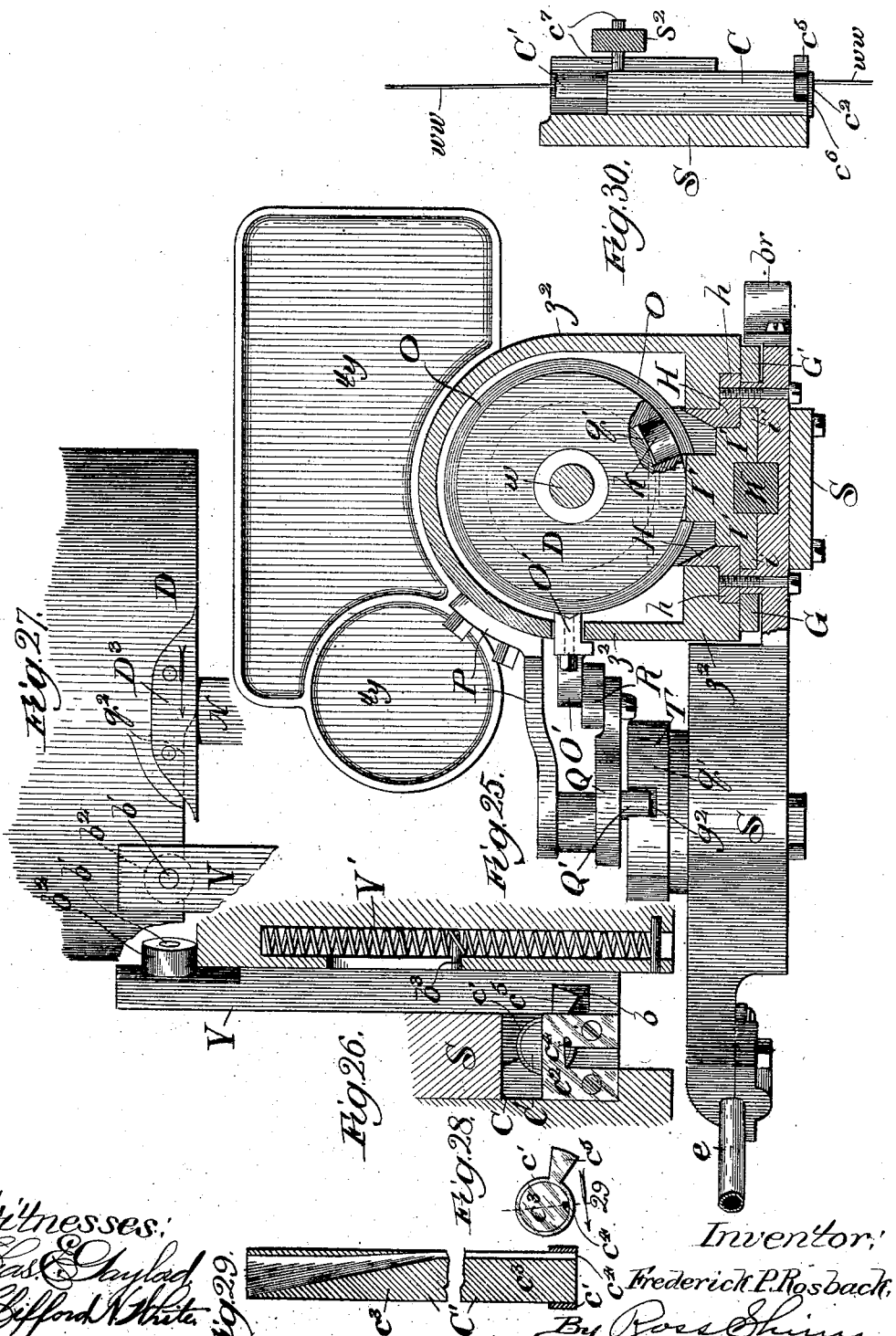

(No Model.)  F. P. ROSBACK.  8 Sheets—Sheet 6.
BOOK STAPLING MACHINE.
No. 493,298.  Patented Mar. 14, 1893.
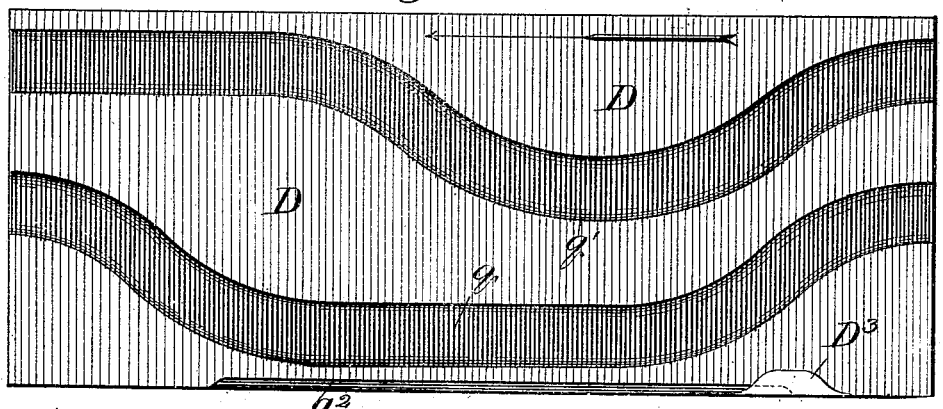
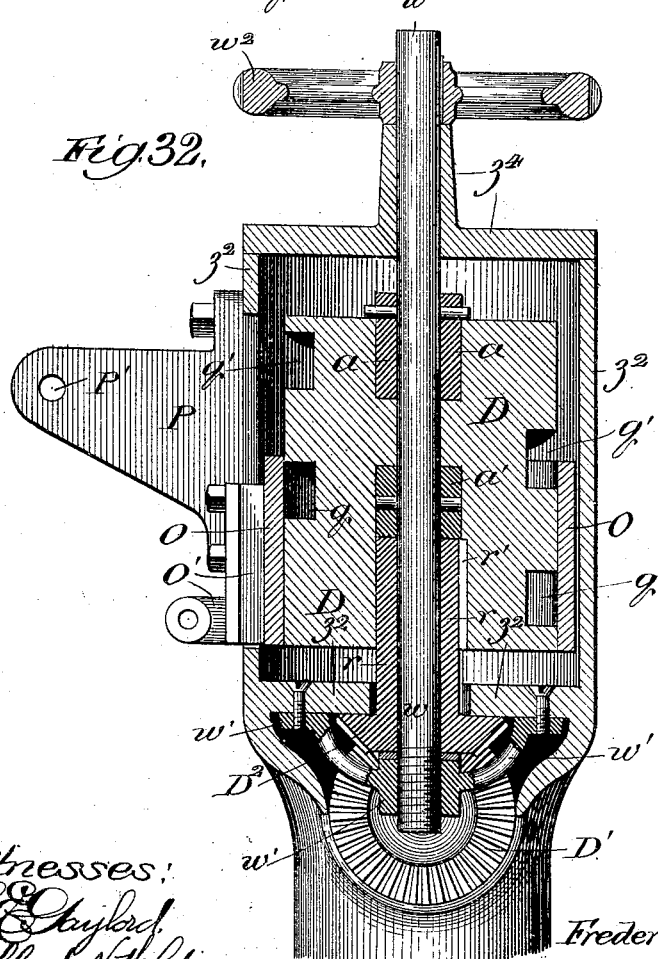
Witnesses:  Inventor,
Frederick P. Rosback,
By Ross Shinn
Attys

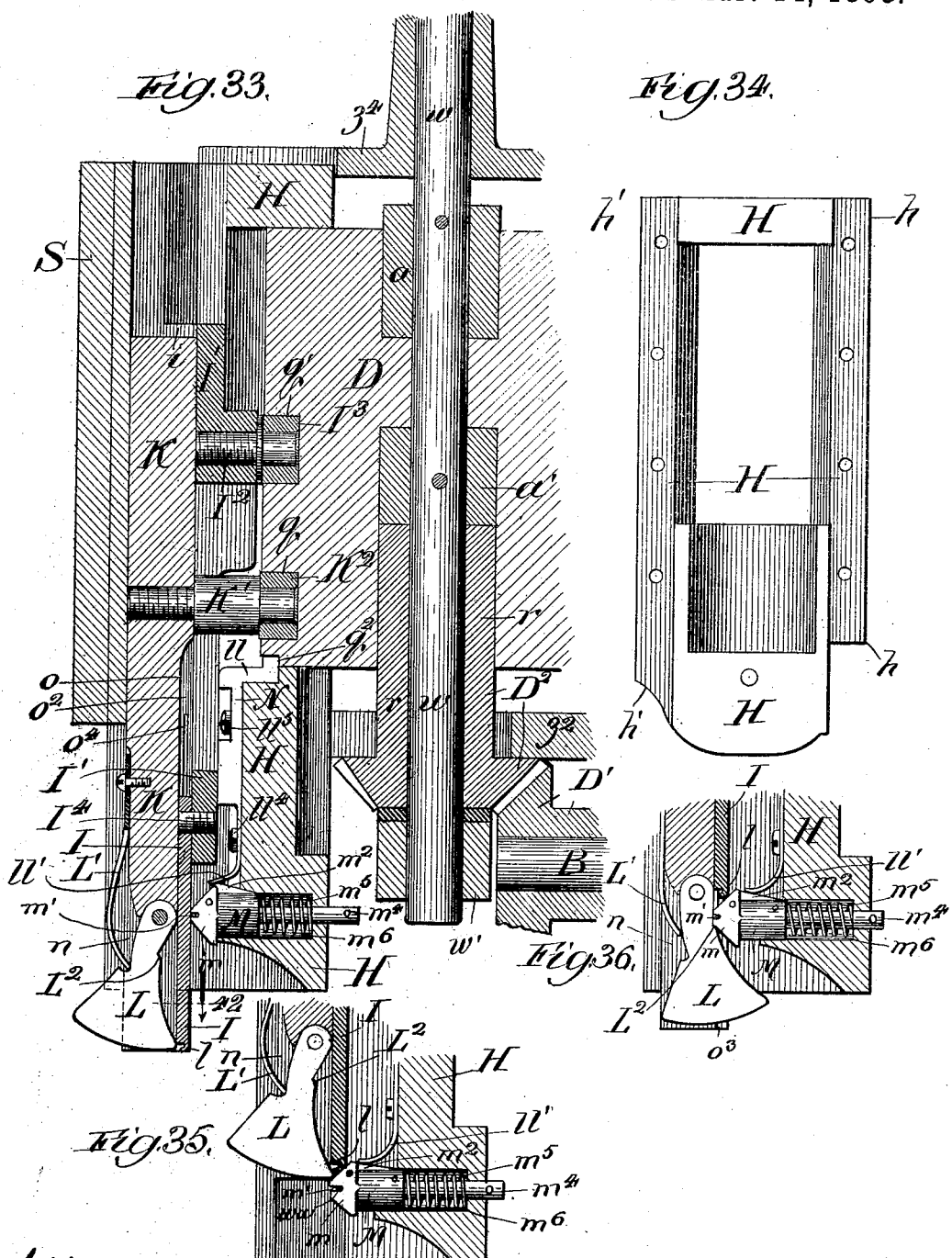

(No Model.)

F. P. ROSBACK.
BOOK STAPLING MACHINE.

No. 493,298. Patented Mar. 14, 1893.

8 Sheets—Sheet 8.

Witnesses:
Chas. E. Gaylord
Clifford N. White

Inventor
Frederick P. Rosback,
By Ross Shinn
Attys.

UNITED STATES PATENT OFFICE.

FREDERICK P. ROSBACK, OF CHICAGO, ILLINOIS.

BOOK-STAPLING MACHINE.

SPECIFICATION forming part of Letters Patent No. 493,298, dated March 14, 1893.

Application filed May 2, 1892. Serial No. 431,569. (No model.)

*To all whom it may concern:*

Be it known that I, FREDERICK P. ROSBACK, a citizen of the United States, residing at Chicago, in the county of Cook and State of Illinois, have invented a new and useful Improvement in Book-Stapling Machines, of which the following is a specification.

My invention relates to that class of machines employed in binding books by means of staples formed from wire which is fed into mechanism, which severs the wire, forms the staple, drives the same into the work and thereinafter clinches the staple.

The more important objects of my improvement are to provide a wire stapling machine, which is capable of having all of its parts simultaneously and relatively adjusted by means of one controlling device, in such a way that the same may be adjusted to staple different thicknesses of work; and the length of the staple formed, the distance the same is driven, &c., all be relatively and proportionately adjusted; and thereby greater perfection secured in the working thereof, than is possible in machines, the different parts of which must be independently adjusted.

Further objects are to provide a wire straightening device and a reciprocating cut-off mechanism which will provide an unbroken path or continuous conduit for the wire while being fed into the machine and, immediately thereafter and before severing the same, will be removed a distance from the block around which the staple is formed, equal to the length of limb the staple is desired to have, and to provide a wire stapling machine generally improved in all its working parts.

Figure 37:
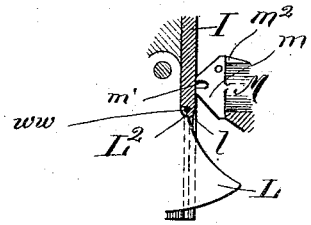
Figure 38:
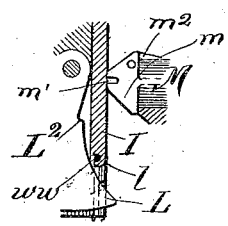
Figure 39:
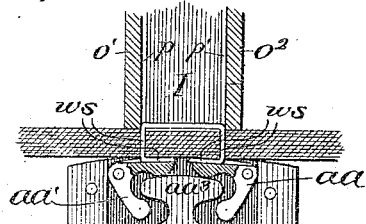
Figure 40:
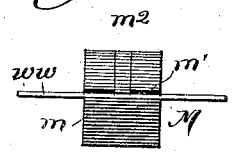
Figure 42:
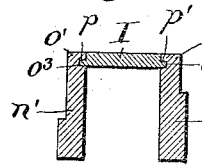
Figure 44:
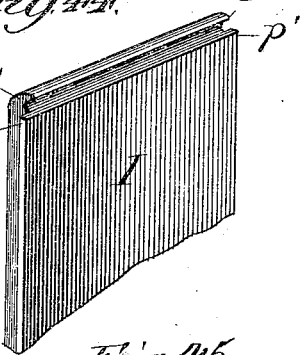
Figure 41:
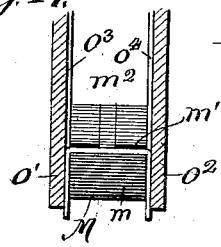
Figure 43:
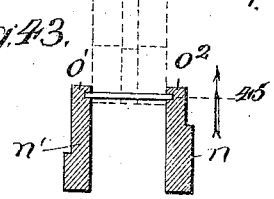
Figure 45:
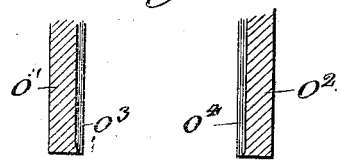
Figure 46:
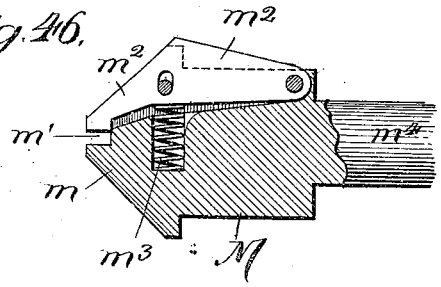

My improved machine is fully illustrated in all its details, in the accompanying drawings, in which:—Figure 1 is a front elevation of my improved machine; Fig. 2, a side elevation representing the right hand side of the machine shown in Fig. 1; Fig. 3, a broken sectional view of the same; Fig. 4, an enlarged broken sectional view of the clutch portion of my machine; Fig. 5, a plan view of the clutch dog; Fig. 6, a cross-sectional view on line 6 of Fig. 4, viewed in the direction of the arrow; Fig. 7, a sectional view in line 7 of Fig. 4, viewed in the direction of the arrow; Fig. 8, a sectional view on line 8 of Fig. 4, viewed in the direction of the arrow; Fig. 9, a side view of the dog-releasing device, or stop; Fig. 10, a plan view of the same; Fig. 11, a plan view of the table with its guide attachments; Fig. 12, a plan view of the saddle, with the portion illustrated in Fig. 11, removed; Fig. 13, an edge view of the table portion of the saddle as indicated by dotted lines 13 in Fig. 2; Fig. 14, an enlarged front elevation of that portion of the machine containing the staple clinching pawls &c., and over the end of which the saddle or table is placed; Fig. 15, a plan-view of the staple clinchers and case shown in Fig. 14; Fig. 16, a broken front elevation of the upper portion of Fig. 14 showing the staple clinching pawls and the operating plunger or slide; Fig. 17, an enlarged perspective view of one of the staple clinching pawls; Fig. 18, an enlarged front elevation of the head portion of the machine with the face plate, former, driver and feed portion of the machine removed. Fig. 19, is an inside face view of such parts as are removed from Fig. 18; Fig. 20, a broken sectional view of the wire-straightening portion of the face plate as viewed from the front of the machine; Fig. 21, a side elevation of the same taken in the line 21 of Fig. 20, and viewed in the direction of the arrow; Fig. 22, an enlarged broken front elevation of the feed arm; Fig. 23, a side elevation of Fig. 22; Fig. 24, a broken perspective view of the end of the feed arm; Fig. 25, a sectional view taken in line 25 of Fig. 18—the parts illustrated in Fig. 19 being in their proper places therein; Fig. 26, an enlarged broken sectional view in line 26 of Fig. 18, viewed in the direction of the arrow; Fig. 27, a diagrammatic view showing the cut-off cam, and the groove which operates the spring that bears against the nippers in the anvil block; Fig. 28, an end view of the "cut-off tube," showing the lug by which the same is turned; Fig. 29, a sectional view on line 29 of Fig. 28, viewed in the direction of the arrow; Fig. 30, a sectional elevation, showing the cut-off mechanism in place on the face plate; Fig. 31, a diagram of the cam, showing the cam grooves for operating the driver, former and nippers, and the cam operating the cut-off; Fig. 32, a sectional view on line 32 of Fig. 2, viewed in the direction of the arrow; Fig. 33, an enlarged sectional view on line 33 of Figs. 18 and 19, showing the parts in position as seen when the wire is being fed in; Fig. 34, a view of the "bed-plate" detached and viewed from the rear; Fig. 35, a sectional view of the anvil block and lower portions of the former and driver and inclined support, showing the relative positions occupied by each, as the former starts to descend upon the wire held in the anvil block; Fig. 36, a view of the parts shown in Fig. 35, with such parts in the position as seen after the former has descended and formed the staple, and at the time the driver is about to descend. Figs. 37 and 38 are diagrammatic views showing the driver in different stages of descent; Fig. 39, a sectional diagram showing the staple after having been formed, driven and clinched; Fig. 40, a front elevation of the anvil block showing the wire held in position and the nippers closed; Fig. 41, a front elevation of the anvil block similar to that shown in Fig. 40, showing the former as having descended upon the wire, passing downward and forming the staple; Fig. 42, a cross-sectional view of the "former" and "driver" shown in line 42 of Fig. 33; Fig. 43, a plan sectional view of the lower portion of the former with the staple in position therein and the anvil block shown in dotted lines; Fig. 44, an enlarged perspective view of the lower end of the driver as shown inverted; Fig. 45, a vertical sectional view on line 45 of Fig. 43; Fig. 46, an enlarged broken sectional view of the anvil block; and Fig. 47, a perspective view of the "detail" detached.

The entire mechanism comprised in my machine may be supported in any suitable manner, but the form of support I have found most desirable is the one illustrated in the accompanying drawings, which consists of a hollow metal standard A (Fig. 1), involving a vertical portion $z$ arising from an expanded hollow base $z'$; and terminating at the upper end in an enlarging portion $z^2$ (Fig. 2), extending at an angle of about forty-five degrees from a vertical portion $z$ and terminating in an opening cut on a vertical plane and also in an opening cut on a horizontal plane; and involving also a branching portion $z^3$ extending from the vertical portion $z$, at a similar angle with, and immediately beneath, the inclined portion $z^2$.

On the top of the part $z^2$ is fastened, by means of screws or bolts, the cap $z^4$.

B is a rotary shaft by which my machine is actuated, and which is journaled on the exterior and interior sides of the thickened part $y$ (Figs. 3 and 4.) of the angularly inclined portion $z^2$ of the hollow metal standard A. On the exterior end of the rotary shaft B is a belt pulley B' on an elongated hub $B^2$ (Figs. 2, 3 and 4.) held between collars $x$ and $x'$; the latter being provided with grooves $x^2$ and $x^3$ cut in its perimeter, providing paths for the clutch-dog releasing device $w'$ and the head $v'$ of the "plunger" actuating rod $v$, respectively.

The inner end of the hub $B^2$ is provided with one or more cuneiform recesses $u$, shown in Figs. 4 and 8, for the reception of the dog $t$, illustrated in Figs. 4, 5, 6 and 7. One surface of each of the cuneiform recesses $u$ (the backward one as the hub revolves in the direction indicated by the arrow in Fig. 8), is made parallel with the hub $B^2$ and shaft B. The dog $t$ is provided with an extremity or nose $t^4$ to accurately fit into the cuneiform recesses $u$, and is made to operate freely within the adjacent spaces $t'$ and $t^2$ provided therefor in the collar $x'$ and shaft B, shown in Figs. 4, 6 and 7, and is further provided with a coiled spring $t^3$ which operates against the pin $x^4$ within the collar $x'$ as shown in Fig. 4. Thus a form of clutch is provided, whereby, when the dog $t$ is in its normal position its nose $t^4$ will intrude one of the cuneiform recesses $u$ in the inner end of the hub $B^2$ and the rotary shaft B will be turned by the belt pulley B' when the latter is revolved in the direction indicated by the arrow in Fig. 8; but when the belt pulley B is revolved in the opposite direction to that indicated by the arrow in Fig. 8 the extremity $t^4$ of the dog $t$ will be forced out of the cuneiform recess $u$ and the revolution of the belt pulley B' will not cause the rotary shaft B to turn. The dog $t$, as will be seen in Figs. 4 and 5, is provided with a nose $t^5$, similar to the nose $t^4$, made by cutting away a portion of the back; which nose $t^5$ is at such a distance from the nose $t^4$ that when the latter intrudes one of the cuneiform recesses $u$ the former will intrude the groove $x^2$—that is the path of the stop $w'$—and when the nose $t^4$ is pushed out of such recess, the former will be pushed out of such groove and vice versa.

C is a pedal, fulcrumed at one side of the base $z'$ as shown in Fig. 5, and extending thence forward and beyond the side of the base; being sustained between the extremities by a coil spring $s$, and from the pedal extends vertically along the inside of the part $z$ of the hollow metal standard A a vertical rod $w$, pivoted at its lower extremity to the pedal C and having its upper end (after passing through the guide bearing $y'$ in the metal standard A) provided with a dog-releasing stop $w'$, as shown in Figs. 2, 3, 4, 9 and 10. By reference to Figs. 10, 9, and 4, it will be seen that this dog-releasing stop $w'$ is wedge shaped and so placed (Figs. 2, 3 and 4), that the edge is toward the observer. If now the shaft B should be turned forward one-half a revolution the said stop $w'$ will engage with the nose $t^5$ of the dog $t$ and, operating to force the dog backward and against the coil spring $t^3$, will draw the nose $t^4$ out of the cuneiform recess $u$ in the hub $B^2$ of the belt pulley B', when the latter will be released and permitted to turn upon the shaft B without rotating the latter; so that if it is desired to have the shaft B to revolve, in order that the mechanism which it controls may be operated, the operator presses his foot upon the pedal C, the vertical shaft $w$ together with the stop $w'$ is thereby pulled downward and the dog $t$ released when the latter will, by the action of the coil spring $t^3$, be thrown forward till the nose $t^4$ will engage with one of the cuneiform recesses $u$ in the hub $B^2$ of the belt pulley $B'$, forming a clutch as aforesaid and causing the rotary shaft B to be revolved and the machinery thereto attached operated in the manner hereinafter described. The inner end of the rotary shaft B is, by the cog wheels $D'$ and $D^2$, bevel geared to the cam D, as shown in Figs. 3, 32 and 33. The bevel cog $D'$ is provided with an elongated hub $r$ fitted loosely within the cam D, but within which it is prevented from turning by means of the loosely fitting key or "feather" $r'$, while at the same time the cam D will be allowed to reciprocate upon the elongated hub $r$, for the purpose hereinafter set forth. The bevel cog $D^2$ and cam D are fitted loosely over the perpendicular rod W around which they together revolve and which will be more particularly described hereinafter.

In the periphery of the cam D are cut grooves $q$, $q'$ and $q^2$ for actuating the former K, the driver I and detail N, as will be made more fully hereinafter to appear.

To the right and left sides of the rectangular opening in the front of the portion $z^2$ of the hollow metal support A are fastened guides G and $G'$, as shown in Figs. 18 and 25, the purpose of which guides is to hold in position the bed-plate H and the parts thereto attached. The bed-plate H—a separate view of the rear of which is shown in Fig. 34—has a general rectangular shape, with an opening somewhat shorter and narrower than the opening in the front of the portion $z^2$ of the hollow metal support A, and is provided with lateral guide flanges $h$ and $h'$ distending sufficiently to be prevented from a forward displacement by engaging with the guides G and $G'$.

$I'$ is a rectangular plate, which I denominate the driver head. It is provided with a central rectangular opening (seen in Fig. 19) and is flanged laterally, as shown at $i$ and $i'$ in Fig. 25, and fits into and between the flanges $h$ and $h'$ of the bed-plate H in a rectangular recess there provided for its reciprocation. To the upper end of the driver head $I'$ is fixed a spindle $I^2$ bearing an anti-friction roller $I^3$ which is made to intrude the groove $q'$ of the cam D (shown in situ in Fig. 33). To the outer surface and lower end of the driver head $I'$ (accurately shown in Figs. 19, 33 &c.) is attached the driver I by means of the pin $I^4$. The driver I is provided with lateral flanges $p$ and $p'$, Figs. 19, 42 and 44, adapted to intrude grooves hereinafter to be described. The driver I is provided at its lower end with a lip $l$ (Figs. 33, 35, 36, 37, 38 and 44) for the purpose hereinafter set forth.

K, Figs. 19, 25, 33, &c., is a rectangular bar which, because of its function in forming the wire into staples, I denominate the former. The former K is made of sufficient width to fit snugly into a groove prepared for its reception and reciprocation, centrally and vertically along the face of the driver head $I'$ between the flanges $i$ and $i'$ thereof, as seen in Figs. 25 and 33. To the back and near the longitudinal center of the former K is fixed a spindle $K'$ bearing the anti-friction roller $K^2$ (Figs. 19 and 33,) which spindle is of such a length that it will pass through the rectangular opening in the "driver head" $I'$ and intrude the groove $q$ in the cam D (Figs. 18, 31, 32 and 33). Into the rear surface of the former K, and below the spindle $K'$, is cut a groove $o$, which is of somewhat less width than the former K, leaving marginal edges $o'$ and $o^2$ (accurately shown in Figs. 41, 42 and 43); into the interior surfaces of which marginal edges $o'$ and $o^2$ are cut longitudinal grooves $o^3$ and $o^4$, the function of which is to provide paths in which the flanges $p$ and $p'$ of the driver I may reciprocate (see Figs. 19, 33, 39, 42 &c.); as will hereinafter more fully be made to appear. At the lower end of the former K, and for the distance of somewhat more than an inch, the aforesaid groove $o$ is cut entirely through from the back to the front of the former K leaving side bars $n$ and $n'$, one on each side of such opening as will be seen in Figs. 33, 42, 43, 45, &c.

Between the side bars $n$ and $n'$ is hinged the device L, shown in Figs. 33, 35, 36, 37 and 39; which, because of its lending support to the wire while the staple is being formed &c., I denominate the inclined support. On the inner surface of the inclined support is a ledge $L^2$. To the front of the former K and above the inclined support L, is fixed the upper end of the flat spring $L'$ (Figs. 33, 35 and 36) with a tension causing the lower end to bear against the inclined support L for the purpose hereinafter shown.

Centrally located in the lower part of the bed-plate H is the device M (Figs. 33, 35, 36, 37 and 46) which from the nature of its purpose is termed the anvil block. The anvil block is provided with a nose $m$, made to fit between the side bars $n$ and $n'$ of the former K; a mouth $m'$ sufficiently distended to admit any size of wire desired for making staples; hinged nippers $m^2$ (Fig. 46) operating against a coil spring $m^3$; a shank $m^4$ sufficiently long to pass entirely through the bed-plate H; and a coil spring $m^5$ operating to throw the anvil block M forward from the aperture $m^6$ in the bed-plate H and into which aperture the "anvil block" may be made to recede.

Figure 47:
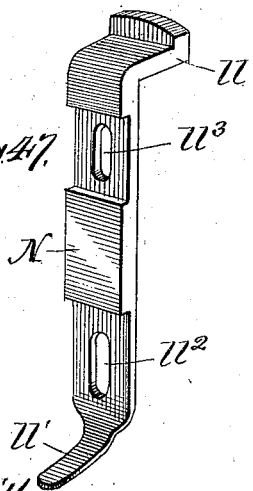

Centrally located on the lower end of the bed-plate H, and vertically placed immediately above the anvil block M is the detail N, Figs. 18, 33, 47 &c. The detail N is a metal bar bent backward at the upper extremity 11 to form a shank of sufficient length to pass through the opening in the bed-plate H and engage the groove $q^2$ on the lower edge of the cam D; (Figs. 31, 33 &c.) terminating at the lower extremity in the flat spring $11'$; and provided with slots $11^2$ and $11^3$, through which the screws $11^4$ and $11^5$ are passed to confine the detail N against the face of the bed-plate H, though permitting a vertical movement of the detail N, limited by the length of the slots $11^2$ and $11^3$ for the purpose hereinafter set forth.

O, Figs. 18, 25 and 32, is a metallic sleeve loosely fitted over the cam D, somewhat shorter than the same. This sleeve O while surrounding the cam D for a great portion of the circumference thereof, yet leaves a sufficient portion of the immediate front of the same uncovered to permit the driver head I' to enter and intrude its spindle $I^2$ and anti-friction roller $I^3$ in the groove $q'$ of the cam D as aforesaid.

On the inner surface of the sleeve O is attached the anti-friction roller $k$ by means of the pin $k'$ so as to engage with the cam D in the groove $q'$ whereby a reciprocating movement will be communicated to the said sleeve O by the revolution of the said cam D. On the left side of the sleeve O is attached an ear O', which protrudes beyond the portion $z^2$ of the hollow metal support A through a slot there provided for the same, as shown in Figs. 18 25 and 32. On the left side of the portion $z^2$ of the hollow metal support A, and near where the ear O' of the sleeve O protrudes, is fixed a wing P (shown in Figs. 18, 25 and 32) which wing P is provided with a hub P' on which is hung the crank Q. The crank Q is united to the ear O' of the sleeve O by means of the link R and is provided with a finger Q' placed somewhat above the stationary pin P' on which the said crank hangs. It will be seen from the above description and illustrations referred to, that an upright reciprocating movement of the sleeve O and the ear O' will, by means of the link R, and crank Q, give a horizontal movement to the finger Q'.

S is the face plate (Figs. 1, 19 and 25), which is a metal plate of sufficient distention to cover the front of the bed-plate H, the opening in front of the portion $z^2$ of the hollow metal support A, the wing P, the crank Q, the link R, and parts thereby operated. The interior surface of the face plate S is grooved to permit the free movement of the "driver head" I' the former K &c., (accurately shown in Fig. 25) when such plate is fastened to the bed-plate as illustrated in Figs. 1 and 25. Upon the inner surface of the face plate S, upon the pin $g$ (accurately shown in Fig. 19) is hung the feed arm T provided with a disk $g'$ at its hinged end. Into the inner surface of the disk $g'$ of the feed arm T is cut a groove $g^2$ passing upward and outward from the center of such disk $g'$, the purpose of which groove $g^2$ is to form a path in which the finger Q' of the crank Q may operate. It will be readily perceived, that the greater the distance from the center of such disk $g'$ the point is at which the pin Q' oscillates the less will be the movement communicated to such disk $g'$ and vice versa.

The free end $g^3$ of the feed arm T is provided with an automatic clamp (shown in Figs. 22 and 23) comprising parts $f, f', f^2, f^3$ and $f^4$.—$f$ being a slotted dog hung upon a pin $f'$ operated upon by the flat spring $f^2$, limited in its movement by the pin $f^3$; and $f^4$ being a ridge against which the dog $f$ is operated to form a clamp. The interior edge of the ridge $f^4$ is provided with a groove $f^5$ (Fig. 24) to aid in retaining the wire within such clamp when the feed arm T is being operated. From which it will be understood that when the end $g^3$ of the feed arm T is thrown upward and outward the groove $f^5$ will slide along the wire; and that when the feed arm T is thrown downward and inward the dog $f'$ &c., will seize the wire and move it forward a distance equal to the movement of the feed arm.

$ww$, Figs. 19 and 1, is the wire from which staples are formed as the machine is operated, this wire being drawn from a spool of the same—$sp$ Figs. 1 and 2—with which the machine is constantly supplied.

At the extreme outer edge of the face plate S, and at the point which the free end of the feed arm T will approach when thrown outward, is placed the wire-straightening device. This consists of a thickened portion S' of the face plate S; (Figs. 19, 20 and 21) a tube $e$; an L-shaped block $e'$; a die $e^2$; and a set-screw $e^3$. The L-shaped block $e'$ and the die $e^2$ are placed edge to edge and have a slight groove $e^4$ cut into the adjacent edges forming a path through which the wire is passed in being fed into the machine. This groove $e^4$ describes the arc of a small circle and curves in a direction opposite to that which the wire inclines to take when being unwound from a spool. By means of the set screw $e^3$ which is made to pass through the flexible arm of the L-shaped block $e'$ the groove $e^4$ is made smaller or larger and any desired tension given to the wire passed through the same. Which tension not only operates to straighten the wire $ww$ as aforesaid; but prevents the wire from slipping backward. The tube $e$ serves as a sort of funnel to aid in causing the end of the wire to enter the groove $e^4$.

On the inner surface of the face plate S is a lever $S^2$ (Fig. 19), fulcrumed on a pin $d$, and provided at its lower extremity with a slot $d'$ and having its upper extremity made in the form of a Y with points $d^2$ and $d^3$;—the lever $S^2$ being so placed, on the inner surface of the face plate S, that these points $d^2$ and $d^3$ of the Y-shaped extremity will be one on each side of a lug $g^4$ which is fixed on the under edge of the disk $g'$ of the feed arm T, and in the path of the same when said arm is operated.

In a groove in the lower part of the face plate S, in such a position as to be at a right angle with the anvil block M, is fitted the cut-off mechanism. The cut-off mechanism (Figs. 19, 26, 27, 28, 29 and 30) consists of a rectangular cut-off block $c$, in a circular opening of which is loosely fitted a cut-off tube $c'$ and against one end of which is fastened by means of screws the knife $c^2$ (accurately shown in Fig. 26). The cut-off tube $c'$ is somewhat longer than the cut-off block $c$ and, as shown in Figs. 28, 29 and 30, is internally fitted with a fixed core $c^3$ in such a manner as to guide the wire, used in making staples, through a small orifice $c^4$ near the circumference of the cut-off tube $c'$; the cut-off tube $c'$ together with the core $c^3$ thereby forming a sort of funnel to guide the wire into the mouth of the "anvil block" M in the manner hereinafter more particularly set forth.

On the circumference of the cut-off tube $c'$, and near the orifice $c^4$ is fixed the lug $c^5$. In the side of the cut-off block $c$, and penetrating to the circular opening provided for the cut-off tube $c'$, is a segmental opening $c^6$ Figs. 19 and 30 through which the lug $c^5$ of the cut-off tube $c'$ may protrude.

It will be seen that when the cut-off tube $c'$ is inserted through the opening therefor provided throughout the cut-off block $c$, in such a manner that the lug $c^5$ of the cut-off tube $c'$ will be in the segmental opening $c^6$ of the cut-off block $c$, and the knife $c^2$ thereafter fastened against the end of the cut-off block $c$, the cut-off tube $c'$ will be confined within the cut-off block $c$ while the lug $c^5$ protruding from the segmental opening $c^6$ provides a means by which the cut-off tube $c'$ may be caused to revolve part of a revolution—the extent of the segmental opening $c^6$—within the cut-off block $c$.

To the same side of the cut-off block $c$ through which the segmental opening $c^6$ is made, but at the other extremity thereof (Figs. 19 and 30) is fixed the pin $c^7$, the purpose of which is to engage with the slot $d^5$ of the arm $S^2$ whereby a horizontal movement may be given to the whole cut-off mechanism for the purpose hereinafter shown.

V, in Fig. 18 is an L-shaped cut-off bar which is capable of an upright reciprocating movement in a groove therefor provided in the bed-plate H of the machine. Longitudinally throughout the face of the shorter arm of the L-shaped cut-off bar V is cut a groove $b$ (Figs. 18 and 26) large enough to receive the lug $c^5$ of the cut-off tube $c'$. To the rear surface of the cut-off bar V, and near the upper extremity thereof is fixed the spindle $b'$ carrying the anti-friction roller $b^2$ (Figs. 26 and 27), in such a position as to be in the path of the small cam $D^3$, when the latter is moved in the direction of the arrow point, by the revolution of the cam D, on the circumference of which the said cam $D^3$ is attached. On the rear surface of the cut-off bar V and at a distance below the spindle $b'$ and the anti-friction roller $b^2$ is fixed a pin $b^3$. Immediately behind the cut-off bar V and in the lower portion of the bed-plate H, in a perpendicular groove there provided (Fig. 26) is a coil spring V', which engages with the pin $b^3$ of the cut-off bar V with a tension downward. From the above description it will be seen that every revolution of the cam D will cause the cam $D^3$ to engage the anti-friction roller $b^2$ on the spindle $b'$ whereby the cut-off bar V will be raised, the lug $c^5$ of the cut-off tube $c'$, being in the groove $b$, will be thereby lifted, whereby the cut-off tube $c'$ will be turned within the cut-off block $c$, when the wire, if protruding from the orifice $c^4$ of said cut-off tube, will be borne against the knife (seen in Fig. 26) and thereby severed; and that immediately after the cam $D^3$ has passed from beneath the anti-friction roller $b^2$ all the parts will, by the tension of the coil spring V', be returned to their normal position.

Upon the perpendicular rod W on which the cam D and bevel cog $D^2$ revolve, is fixed collars $a$ and $a'$ (shown in Figs. 32 and 33.) which prevent the cam D from reciprocating thereon and as will be seen, particularly in Fig. 33, portions of the bed-plate H bear against both the upper and lower ends of the cam D, so that while the latter is permitted to revolve therein any vertical displacement of the cam D will cause a corresponding displacement of the bed-plate H together with all the parts thereto attached.

Beneath the portion $z^2$ of the hollow metal support A, and behind the vertical opening in front of which the bed-plate H and the "face plate" S with their attendant parts are placed, is fastened—by means of screws or bolts—the stirrup W' (Figs. 32 and 33). This stirrup W' is formed into a nut through which the screw cut on the lower extremity of the perpendicular rod W operates. The upper extremity of the perpendicular rod W passes through the cap $z^4$ of the hollow metal support A, and extends beyond the thickened portion thereof made to provide a steadier bearing therefor, and has fixed to its extremity the hand wheel $W^2$. The bevel cog $D^2$ (Fig. 32 &c.,) rests upon the stirrup W' while its elongated hub $r$ passes upward through the part $z^2$ of the hollow metal support A and enters the cam D in the manner hereinbefore described. It will now be understood that when the perpendicular rod W is, by means of the hand wheel $W^2$, screwed into or out of the stirrup W', the cam D, the bed-plate H and all the attached mechanism will be lowered or raised thereby—the cam D reciprocating upon the elongated hub $r$ of the bevel cog $D^2$, yet being prevented from turning thereon by the key or "feather" $r'$ as hereinbefore described.

On the right hand edge of the "face plate" S, as shown in Figs. 1 and 2, is fastened a small inverted bracket $br$, with a thickness sufficient to extend somewhat over the forward edge of the part $z^2$ of the metal support A; and on such portion of the metal support A, below the inverted bracket $br$, is fixed the bracket $br'$ of the same size; which together will form a gage for adjusting the machine to the thickness of the work desired to be stapled; for as the face plate S, the bed-plate H and all the parts thereon dependent are, together with the cam D, raised and lowered by turning the hand wheel $W^2$, insomuch will the distance between the extended arms of the inverted bracket $br$ and the bracket $br'$ be increased or decreased—this distance being equal to the nearest approach of the driver I to the table or saddle supporting the work to be stapled.

The hand wheel $W'$ and mechanism thereby controlled is held in adjustment by means of the spring stop $W^2$ (Figs. 1 and 2) which engages with the corrugations on the circumference of the hand wheel $W^2$. It will now be also understood, by reference to Figs. 18 and 19, that as the face plate S &c., is raised in the manner above described, the disk $g'$ of the feed arm T will, in consequence thereof, be raised and the finger $Q'$ will be thereby made to take a position in the groove $g^2$ nearer the center of such disk and as a result thereof a given oscillation of the finger $Q'$ will thereafter give a greater movement to the feed arm T, which will cause a greater length of wire to be fed into the machine, to be cut off and formed into staples with longer limbs suitable to the work of such increased thickness, and that a reverse movement of the face plate will have an opposite effect.

The lower extremity of the plunger actuating rod $v$ hereinbefore (Fig. 3) referred to, is pivoted to the plunger lever $v^2$ within the standard $z$ of the hollow metal support A. The plunger lever $v^2$ is fulcrumed at $v^3$ (Figs. 2 and 3) and projects forward through and beyond the branching portion $z^3$ of the hollow metal support A. To the outer extremity of the plunger lever $v^2$ is pivotally affixed the plunger X (Figs. 1, 2, 3, 14, 16, &c.,) in such a position that it will rise immediately under the driver I &c., which reciprocates vertically in the bed-plate II &c., hereinbefore described.

Fastened to the front of the branching portion $z^3$ of the hollow metal support A, and in such a manner that the same will be immediately under the driver I &c., is the clinching device shown in Figs. 1, 2, 14, 15, 16, &c., which consists of a double plate $X'$ rigidly and perpendicularly fastened to the part $z^3$ of the hollow metal support A; the adjacent surfaces of which double plates $X'$ are so grooved as to permit the plunger X to reciprocate vertically therein; such grooves being slightly widened in the upper portion thereof to admit the V-shaped pawls $aa$ and $aa'$ (Figs. 15, 16, and 17). The V-shaped pawls $aa$ and $aa'$ are each pivoted at its apex near the edge of such groove and near the upper extremity of the double plate $X'$. Each of the pawls $aa$ and $aa'$ is grooved in its upper surface; which grooves converge toward the free end. (Figs. 15 and 17.) The upper extremity of the plunger X is provided with a T-shaped head $aa^3$, the opposite extremities of which head engage with the V-shaped pawls $aa$ and $aa'$ as accurately shown in Fig. 16. It will now be understood that insomuch as the staple clinching device is immediately beneath the former K, the driver I &c., the points of the staples when driven, will be driven into the grooves on the upper edges of the V-shaped pawls $aa$ and $aa'$; that if this is done when the plunger X is down the points of the staples will invariably be bent toward each other; and that if the plunger X be then forced upward the clinch of the staple will be perfected as shown in Fig. 39—$ws$ being the wire staple.

Within the groove $x^3$ on the rotary shaft B (Figs. 2, 3 and 4) is fixed in the cam $v^4$ (Fig. 6). It will be seen that at each revolution of the rotary shaft B this cam $v^4$ will engage with the anti-friction roller in the head $v'$ of the plunger actuating rod $v$, pushing the same downward, when, by the movement of the plunger lever $v^2$, the plunger X will be made to rise in the groove between the vertical double plate $X'$ whereby the V-shaped pawls $aa$ and $aa'$ will be forced against the staple theretofore driven, perfectly clinching the same as above.

To insure the perfect working of the plunger actuating rod $v$ &c., a coil spring $v^5$ (Figs. 3 and 1) is employed, linking the plunger lever $v^2$ to the branching portion $z^3$ of the hollow metal support A the tension of which coil spring $v^5$ is to cause the plunger rod to bear upward, thrusting the anti-friction roller in the upper extremity $v'$ into the groove $x^3$ and against the cam $v^4$ on the rotary shaft B.

To each side of the front of the branching portion $z^3$ of the metal support A is rigidly fastened a saddle bracket Y and $Y'$ (Figs. 1 and 2). These saddle brackets are made in the shape of the frustum of a wedge with the converging faces at a right angle each to each, and each at forty-five degrees from a perpendicular: the upper base of the frustum is therefore horizontal.

Z and $Z'$ (Figs. 2, 11, 12 and 13) are thin metallic plates of any desired size fixed at a right angle each to each by means of angle irons $bb$ and $bb'$. The angle irons $bb$ and $bb'$ are so disposed on the under surfaces of the plates Z and $Z'$ that, by means of the wing nuts $bb^2$ and $bb^3$ (Figs. 2 and 13) they may be rigidly fastened to the saddle brackets Y and $Y'$.

At the angle formed by the union of the plates Z and $Z'$, and between the angle irons $bb$ and $bb'$ is an aperture $bb^4$ adapted to permit the penetration of the perpendicular double plate $X'$, as shown in Figs. 1 and 2. Near the lower edge of the plate Z, also between the angle irons $bb$ and $bb'$, is a similar aperture $bb^5$ for a like purpose.

It will be understood that the saddle formed by the plates Z and $Z'$, as shown in Fig. 2, may, by loosening the wing-nuts $bb^2$ and $bb^3$, be made to serve as a table by placing it in the position indicated by the dotted lines 13 Fig. 2, when the wing nut $bb^2$ will take the position of the dotted indication thereof and can be there secured. The upper extremity of the perpendicular double plate $X'$ will then protrude from the aperture $bb^5$ (Fig. 11) in the plate Z.

In Fig. 11, $cc$ and $cc'$ are adjustable guides to aid in properly placing the work to be stapled when the plate Z is used as a table.

In Fig. 1, $t'$ is an adjustable table or tray hinged to the hollow metal support A, and provided with a standard $st$, which table is an auxiliary to my machine and constitutes no part of my invention.

In Figs. 25, 2 and 1, $ty$ is a tray which I have bracketed to the rear of the part $z^2$ of the hollow metal support A, as a convenient receptacle for tools &c., and not as an element of my invention.

My machine is operated as follows:—If the work to be stapled has been folded and is to be secured in the fold, the angularly attached plates Z and Z' are secured upon the saddle brackets Y and Y' as a saddle; but if the work has not been folded, the attached plates are placed as a table and the guides $cc$ and $cc'$ adjusted as desired. By means of the hand wheel $W^2$, the face plate S together with the bed-plate H, the cam D, and all the co-relative parts are simultaneously adjusted according to the thickness of the work to be stapled as gaged by the inverted bracket $br$ on the edge of the face plate S and the bracket $br'$ on the side of the part $z^2$ of the hollow metal support A, (Figs. 1 and 2.) The belt pulley B', revolving in the direction indicated by the arrow in Fig. 8, the shaft B will be caused to turn by pressing the pedal C, which will draw the stop $w'$ at the upper extremity of the vertical shaft $w$ downward releasing the nose $t^5$ of the dog $t$, when, by the action of the coil spring $t^3$, the nose $t^4$ will be thrust forward into one of the cuneiform recesses $u$ in the end of the hub $B^2$ of the said belt pulley B' whereby a clutch is formed as hereinbefore described; and the turning of the pulley B' will cause the rotary shaft B to revolve; the rotary shaft B will turn the bevel cog D' thereto attached; the turning of the bevel cog D' will turn the bevel cog $D^2$ geared thereto; the turning of the bevel cog $D^2$ (the prolonged hub $r$ thereof being prevented from turning within the cam D by the feather $r'$) will cause the revolution of the cam D in the direction indicated by the arrow in Fig. 31. Because of the position of the anti-friction roller $k$ on the spindle $k'$, on the inner surface of the sleeve O, in the groove $g'$ of the cam D,—the initial movement being upward—the motion being communicated to the crank Q by the ear $o'$ on the sleeve O and the link R (Figs. 18 and 32) the finger Q' will be moved horizontally outward. The finger Q', being in the groove $g^2$ of the disk $g'$ of the feed arm T (the face plate S and parts thereto attached, Fig. 19, being secured in their proper places in the bed-plate Fig. 18) such outward movement of the finger Q' will cause the disk $g'$ to turn on the pin $g$ whereby the lower extremity $g^3$ of the feed arm T will be thrown inward and the wire $ww$ fed into the machine by the automatic clutch thereon and hereinbefore described. Because of the space between the points $d^2$ and $d^3$ of the Y-shaped upper extremity of the cut-off arm $S^2$ there is considerable movement made by the lug $g^4$ on the said disk $g'$ before the said lug $g^4$ engages with the said point $d^3$ and thereafter causing the said cut off arm $S^2$ to be moved about the fulcrum $d$ and the lower extremity and slot $d'$ thereof moved outward; thereby permitting a certain portion of the wire $ww$ to be fed through the mouth $m'$ of the anvil block M while the cut-off block $c$ and cut-off tube $c'$ therein remain against such anvil block making a perfect and continuous conduit for such wire and insuring it against miscarriage. When the said lug $g^4$ on the disk $g'$ of the feed arm T does engage with the point $d^3$ of the cut-off arm S' the inward movement of the same and consequent outward movement of the other extremity thereof will draw the cut-off block $c$ &c., away from the "anvil block" M aforesaid a sufficient distance that the length of wire therein will provide a limb for the staple to be formed. At this precise instant the shank 11 of the detail N (Figs. 47, 33, 35, 36 and 18) is forced downward by the groove $g^2$ (Fig. 31 &c.,) the flat spring 11' on the lower terminus of such "detail" bears upon the "nippers" $m^2$ of the anvil block M (Fig. 46 &c.) forces the same downward, holding the wire firmly in the mouth $m'$ of such anvil block. The anti-friction roller $b^2$ on the spindle $b'$ on the rear of the L-shaped cut-off bar V (Figs. 18 and 26) engages with the small cam $D^3$ (Figs. 27 and 31) raising the same. The groove $b$ of such bar engages with the lug $c^5$ of the cut-off tube $c'$ in the cut-off block $c$ (Figs. 26, 28 &c.,) lifts the same, turns such tube in such block, forces the wire in the orifice $c^4$ against the knife $c^2$ and severs the wire—see Fig. 40. It will be evident that the extent of the movement of the feed arm T regulates the length of the wire fed through the "anvil block" M and also the distance that the cut-off block $c$ &c., will be drawn backward: or in other words, the length of the wire fed in and cut off from which a staple may be formed,—the cut off mechanism working with equal facility at whatever point the lug $c^5$ may be drawn back to within the groove $b$ (Fig. 18) of the lower extremity of the L-shaped cut-off bar V. And it will be further seen that the extent of the movement of the feed arm T depends upon the distance of the finger Q', in the groove $g^2$ of the disk $g'$ from the pin $g$ in the center of such disk and on which such disk turns; which position of the said finger in such groove is governed by the elevation of the face plate S, the bed-plate H, the cam D and their dependent parts; which elevation is governed by the hand wheel $W^2$ as hereinbefore shown. While the wire $ww$ is being fed into and through the anvil block M, the former K (having the inclined support L between its side bars $n$ and $n'$) together with the "driver" I simultaneously rise from the position indicated in Fig. 33 to that indicated in Fig. 35.

At this time the wire is cut-off but held within the mouth of the anvil block by the pressure of the detail N upon the nippers as above described (Fig. 40). The former K (being actuated by the anti-friction roller K² on the spindle K' engaging with the cam D in the groove q thereof) now descends in advance of the driver I until the position is reached that is indicated in Fig. 36—the side bars n and n' passing down on each side of the anvil block M bending the ends of the wire protruding therefrom downward forming the staple (also Fig. 40) while the inclined support L bears against the mouth of the anvil block. It will be seen that the limbs of the staple are now in the grooves o³ and o⁴ on the inside of the side bars n and n' of the former K; (Figs. 33, 41 and 36) that is to say in the paths provided for the flanges p and p' of the driver I (Figs. 36 and 42). The former K now remains in this position until the driver I has reached the limit of its descent. The driver I now—Fig. 36—(being actuated by the anti-friction roller I³ on the spindle I² of the driver head I' engaging with the cam D in the groove q' thereof, Figs. 31, 33, &c.,) begins its descent. The first movement of the driver I from the position illustrated will force the anvil block M backward into the bed-plate H and against the coil spring m⁵; but the ends of the wire staple, being in the grooves o³ and o⁴ as aforesaid, the staple will remain when the anvil block is thus forced backward. The driver I continuing to descend pushes the staple down against the ledge L² of the inclined support L, in which position it will be held, because of the tension of the leaf spring L' until it is forced into the lip l of the "driver" I as shown in Fig. 37, when it will be forced downward, as shown in Fig. 38, until the "driver" I reaches the limit of its descent;—that is until the staple is completely driven (Fig. 39), the lip l operating to prevent the downward kinking of the staple shank while the staple is being driven. It will be seen that since the lip l of the driver I so nearly surrounds the top of the staple, the same being aided by the pressure of the "inclined support" L, while the grooves o³ and o⁴ guard three fourths of the circumference of the limbs, that the staple is prevented from kinking or breaking down, and in consequence thereof much thicker work may be stapled than could otherwise be done. When the staple is driven, the ends are clinched below by the action of the plunger X and pawls aa and aa' (Figs. 14, 15 16 &c.,) within the vertical double plate Z', in the manner hereinafter described.

It will be understood that the various parts are returned to their first described positions by a continuation of the movement of the actuating parts, aided by gravity and the springs indicated.

What I claim as new, and desire secured by Letters Patent, is—

1. In a book-stapling machine, the combination with the standard, a support for the work, and a bed plate supporting reciprocating staple-forming and wire cutting mechanism, and reciprocating driving mechanism, of an adjustable actuating cam whereby the bed plate, driving mechanism and staple forming and wire cutting mechanism may be simultaneously and relatively adjusted, substantially as and for the purpose set forth.

2. In a book-stapling machine, the combination with a standard, a support for the work, and a bed-plate supporting reciprocating staple-forming and wire-cutting mechanism, and reciprocating driving mechanism, of an adjustable actuating cam D and an adjusting rod W, which is provided with collars a and a' (between which collars and on which rod W the said cam D is free to revolve) and a terminal screw which operates in a nutted portion of said standard, whereby the turning of which adjusting rod W, the said cam D, the driving mechanism, the staple-forming mechanism and wire cutting mechanism are simultaneously and relatively adjustable, substantially as and for the purpose set forth.

3. In a book-stapling machine, the combination with a standard, a support for the work, and a bed-plate supporting reciprocating staple-forming and wire-cutting mechanism, of an adjustable actuating cam D; and an adjusting rod W with collars a and a' (between which collars and on which said rod the said cam D is free to revolve) and a terminal screw extending through a nutted portion W' of said standard, a bevel cog D² having an elongated hub r provided with a feather r' upon which elongated hub r the said cam D is made to reciprocate, and upon which elongated hub r the said cam D is prevented from turning by means of said feather r'; and a rotary shaft B provided with a bevel cog D' to which the bevel cog D² is geared, substantially as and for the purpose set forth.

4. In a book-stapling machine, the combination with a standard, a support for the work and a bed-plate supporting staple forming mechanism an automatic feed and wire severing mechanism employing an inclined support L, of a reciprocating driver I provided with a lip l at its lower extremity, and a ledge L² on the adjacent surface of the said inclined support L, substantially as and for the purpose set forth.

5. In a book-stapling machine, the combination with a standard, a support for the work and a bed plate supporting reciprocating driving mechanism, wire cutting mechanism and a former K substantially as described, of an anvil block M secured in said bed plate, and having a nose m, mouth m', nipper m² and coil spring m³, shank m⁴, and coil spring m⁵, which anvil block M may be made to recede into an orifice m⁶ in said bed plate, substantially as and for the purpose set forth.

6. In a book-stapling machine, the combination with a standard, a support for the work and a bed-plate supporting reciprocating driving mechanism and reciprocating staple forming mechanism, of an anvil block M provided with a mouth $m'$, a nipper $m^2$ and coil spring $m^3$, substantially as and for the purpose set forth.

7. In a book-stapling machine, the combination with a standard, a support for the work and a bed plate H supporting reciprocating driving mechanism, wire cutting mechanism, and a reciprocating staple former, of an anvil block M which is provided with a mouth $m'$, a nipper $m^2$ and a coil spring $m^3$, and a detail N which is provided with a shank 11, a flat spring $11'$, slots $11^2$ and $11^3$, and screws $11^4$ and $11^5$ passing through the said slots securing said detail from forward displacement against the said bed plate H, substantially in the manner and for the purpose set forth.

8. In a book-stapling machine, the combination with a standard, a support for the work and a bed plate supporting reciprocating staple forming mechanism and wire cutting mechanism, of a reciprocating driver I provided with a curved lip $l$ at its lower extremity, substantially as and for the purpose set forth.

9. In a book-stapling machine, the combination with a standard, a support for the work and a bed plate H supporting reciprocating driving mechanism, an automatic feed and wire cutting mechanism, of a reciprocating staple former K substantially as described, an anvil block M provided with a mouth $m'$, a nipper $m^2$ and coil spring $m^3$, a detail N, and a reciprocating driver I provided with a lip $l$, and movable in grooves in the side bars of the former K, substantially as and for the purpose set forth.

10. In a book-stapling machine, the combination with a standard, a support for the work and a bed plate supporting reciprocating staple forming and driving mechanism, and wire straightening mechanism, of a feed arm provided with an automatic clamp comprising a slotted dog $f$, pins $f'$ and $f^3$, flat spring $f^2$, ridge $f^4$ and groove $f^5$, all substantially as and for the purpose set forth.

11. In a book-stapling machine, the combination with a standard, a support for the work and a bed plate supporting reciprocating staple forming and driving mechanism, of a feed arm T fulcrumed on a pin $g$ and provided with a groove $g^2$ extending outward from the said fulcrum and adapted to engage with an oscillating finger having a limited movement, whereby the movement of said feed arm may be increased or diminished, substantially in the manner and for the purpose set forth.

12. In a book-stapling machine, the combination with a standard, staple driving mechanism and staple forming mechanism employing oscillating parts, of reciprocating cut-off mechanism comprising a cut-off block $c$, a cut-off tube $c'$, a knife $c^2$, orifice $c^4$, lug $c^5$, and pin $c^7$ made to engage with the oscillating parts of said staple forming mechanism substantially as and for the purpose set forth.

13. In a book-stapling machine, the combination with a standard staple forming mechanism and driving mechanism employing a feed arm T provided with a lug $g^4$, of reciprocating cut-off mechanism comprising a cut-off block $c$, cut-off tube $c'$, knife $c^2$, orifice $c^4$, lug $c^5$ and pin $c^7$; and a cut-off lever $S^2$ fulcrumed on a pin $d$ and provided with a Y-shaped extremity having points $d^2$ and $d^3$ and slot $d'$ in the lower extremity, which said slot $d'$ is placed to include the said pin $c^7$ of the said cut-off mechanism and which points $d^2$ and $d^3$ of the said Y-shaped extremity of said cut-off lever $S^2$ are placed to intrude into the path of the said lug $g^4$ of the said feed arm T, substantially as and for the purpose set forth.

14. In a book-stapling machine employing reciprocating staple forming mechanism, reciprocating driving mechanism, an automatic feed arm (provided with a lug $g^4$ and mechanism for oscillating such feed arm upon a pin $g$) and reciprocating cut-off mechanism, the combination therewith of a cut-off lever $S^2$ a pin $d$ on which said lever is fulcrumed, points $d^2$ and $d^3$ of a Y-shaped extremity of said cut-off lever,—the said points $d^2$ and $d^3$ of the said Y-shaped extremity of the said cut-off lever $S^2$ being placed to intrude into the path of the said lug $g^4$ on the disk $g'$ of the said feed arm whereby an intermittent movement is communicated to the said cut-off lever $S^2$ substantially as and for the purpose set forth.

15. In a book-stapling machine employing reciprocating staple forming mechanism and reciprocating driving mechanism the combination therewith of a feed arm T having an automatic clutch, fulcrumed on a pin $g$ and provided with a groove $g^2$ and a lug $g^4$, a cut-off lever $S^2$ fulcrumed on a pin $d$ and provided with a Y-shaped extremity having points $d^2$ and $d^3$, and a slot $d'$ in the longer extremity, and reciprocating cut-off mechanism comprising a cut-off block $c$, a cut-off tube $c'$, a knife $c^2$, an orifice $c^4$, lug $c^5$, and pin $c^7$, substantially as and for the purpose set forth.

16. In a book-stapling machine, the combination with reciprocating staple forming and driving mechanism employing a cam D, of a standard A provided with a wing P, a sleeve O provided with a pin $k$ (made to engage the cam D,) an ear O' coupled by a link R to a crank Q on said fixed wing P, and the crank Q pivotally attached to the said wing P by a pin P' and provided with an oscillating finger Q' substantially as and for the purpose set forth.

17. In a book-stapling machine, the combination of a hollow standard A having an inclined portion $z^2$ provided with a fixed wing P and a thickened portion $y$ and a cap $z^4$, and carrying a driving shaft B journaled on the exterior and interior sides of the said thickened portion $y$, and which driving shaft carries loosely a driving pulley B' and an automatic clutch controlled from the pedal C, bevel cogs D' and D$^2$, actuating cam D made to reciprocate upon an elongated hub $r$ of the bevel cog D$^2$ but revolved therewith by means of the feather $r^2$ upon a perpendicular shaft W between collars $a$ and $a'$ (and by the raising and lowering of which collars $a$ and $a'$ and shaft W the said cam is reciprocated upon the said elongated hub) and within an opening in a bed plate, a bed plate H capable of vertical movement before an opening in the inclined portion $z^2$ of the metal support A, but confined thereto by guides G and G', and carrying a reciprocating former K, reciprocating driver and driver-head I and I', an anvil block M, a detail N, a cut-off bar V and a face plate S, a sleeve O, with an ear O' coupled by a link R to a crank Q, which turns about a pin P' and the fixed wing P and is provided with a finger Q', a feed arm T fulcrumed on a pin $g$, provided with an automatic clutch, a groove $g^2$ and a lug $g^4$, a cut-off lever $S^2$ fulcrumed on the pin $d$ and provided with a slot $d'$ and a Y-shaped extremity having points $d^2$ and $d^3$; reciprocating cut-off mechanism comprising a cut-off block $c$, a cut-off tube $c'$, knife $c^2$, lug $c^5$ and pin $c^7$; wire straightening mechanism comprising a thickened portion S', a tube $e$, a block $e'$, a die $e^2$, a set screw $e^3$ and groove $e^4$, a branching portion $z^3$, of the hollow metal standard A, supporting saddle and table brackets Y and Y' (to which are fixed plates Z and Z') and a double plate X containing clinching pawls $aa$ and $aa'$ and a reciprocating plunger X', and a plunger lever $v^2$ pivotally attached to a vertical rod $v$ with a head $v'$ to bear against the rotary shaft B and actuated by a cam $v^4$ on said shaft, the whole being constructed and arranged to operate substantially as and for the purpose set forth.

FREDERICK P. ROSBACK.

Witnesses:
 ROSS SHINN,
 THORNTON HALL.